Robert E. Brooks
INVENTOR.

United States Patent Office 3,716,287
Patented Feb. 13, 1973

3,716,287
FOURIER TRANSFORM HOLOGRAPHIC MEMORY WITH RANDOM PHASE SHIFTING PRODUCED BY RANDOM SIZE VARIATIONS IN A LENS ARRAY
Robert E. Brooks, Redondo Beach, Calif., assignor to TRW Inc., Redondo Beach, Calif.
Filed Oct. 4, 1971, Ser. No. 186,345
Int. Cl. G02b 27/00
U.S. Cl. 350—3.5                                       11 Claims

ABSTRACT OF THE DISCLOSURE

A holographic system for recording data, particularly digital data. The data is represented by an array of light modulators such, for example, as an opaque sheet having apertures therein which represent the digital data. The openings in the opaque array or light modulators are illuminated by coherent light; they are relatively large so that they are less subject to closure due to dirt, or damage due to scratches. The resulting light beams passing the apertures are focused by an array of optical elements, each into a focal point, which are much smaller than the apertures. The optical elements may consist of spherical lenses or the like. The array of lenses determines the location of the focal points which are the data points. Accordingly, alignment tolerances of the opaque aperture sheet are no longer critical. The phases of the light waves representing the data points may be averaged, for example, by the manufacturing tolerances of a lens array. Accordingly, the intensity of the subject beam at the hologram is made more uniform so that the light intensity is utilized more efficiently.

BACKGROUND OF THE INVENTION

This invention relates generally to holography and particularly relates to a holographic system for recording data, particularly digital data.

Holography is sometimes called wavefront reconstruction and permits to record on a photosensitive recording medium both the amplitude or intensity and the phase of an optical wave. Usually, not only a subject wave which carries the data or scene to be recorded, but also a wave are caused to fall on the recording medium. The reference wave serves the purpose to determine the phase of the subject wave. The two beams falling on the recording medium create a stationary interference pattern which forms the hologram. If the hologram is reconstructed or reilluminated with a reference beam the subject waves are recreated visually with their original intensities and phases so that the scene that has been recorded may be viewed in three dimensions.

In the past, holography has been used extensively for recording picture information such as three dimensional objects or scenes. Recently, it has been proposed to use holography for recording data and particularly digital data for compact storage and future recall. The data may be a graph, a text or simply digital information. The holograms are usually small in size such as a few millimeters.

For recording digital data the subject beam is spatially modulated by a suitable data mask, that is by an opaque sheet having apertures therein to provide an array or pattern of bright spots and dark areas representative of the digital data. By convention a bright spot might represent a logical "one" and the dark area a "zero." However, the opposite convention may be used. Conveniently, the array of data points may be generated by passing the subject beam through a photographic film upon which the data has previously been recorded in the form of transparent spots and opaque areas. In this case, scratching of the film will deteriorate the quality of the recorded data.

Accordingly, in order to obtain good optical efficiency and to make the recorded array of data immune to accidental blockage of the apertures by dirt, or scratching in the case of film, the size of each light aperture should be as large as possible. This, of course, will increase the size of the resulting array. On the other hand, in order to insure maximum redundancy of the recorded hologram and maximum signal-to-noise ratio during readout of the data from the hologram, each aperture should approximate a small bright point of light. The latter requirement is not consistent with the desirability of having relatively large apertures.

Furthermore, the diffraction pattern created by the subject beam and the reference beam on the recording plane of the recording medium, when recording a periodic data array, contains large intensity peaks of the light. This is difficult to record on the usual film used for holographic recording. Therefore, in order to avoid overexposure by the intensity peaks of the recorded data and yet to maintain a relatively high average light intensity, it is desirable to smooth out or average out these extreme intensity variations of the subject beam at the recording medium.

It has been suggested in the past to accomplish this end by providing a suitable phase plate which is interposed into the path of the subject beam. Such a phase plate may consist of a transparent substrate on which are evaporated spots of a dielectric material such as cerium oxide. As a result the optical thickness of such a phase plate varies at random from spot to spot. On the other hand, the optical thickness is relatively uniform over a given area. The array of the dielectric spots is made to match the apertures of a data mask and is usually placed in close proximity thereto. Accordingly, the phase of the light from each bright spot varies in a random manner. However, the manufacture of such a phase plate is difficult and it is expensive. This is particularly so if a high degree of randomness is to be imparted to the spots.

It is accordingly an object of the present invention to provide a holographic data recording apparatus wherein the size of the aperture of the data array may be relatively large so that the apertures are less susceptible to closure due to dirt or damage while still permitting the recording of the data array on a microhologram with a high degree of redundancy.

A further object of the invention is to provide a holographic apparatus for recording particularly digital data where the exact location of the apertures of the data array is not critical so as to minimize the need for precise alignment.

Another object of the invention is to provide holographic apparatus of the type discussed which provides randomness of the phases of the data points so as to make more efficient use of the light incident on the recording medium and to utilize the redundant nature of the hologram.

SUMMARY OF THE INVENTION

A holographic apparatus for recording data such as digital data in accordance with the invention includes a light source such as a laser for developing a coherent light beam. As is conventional in the holographic art, means are provided for splitting the light beam into a reference and a subject beam. A recording medium such as a photographic film or photochromatic material is disposed in a predetermined location for recording a hologram. Further means are provided for directing the reference beam toward the recording material.

In accordance with the present invention a first array of light modulators is provided which represents the data to be recorded. The first array is disposed in the path of the subject beam. Finally, a second array of optical elements is disposed in the path of the subject beam and ahead of the recording material. Each of the optical elements focuses the light which has passed one of the light modulators in a focal point. Accordingly, there is no longer a necessity for the first array to be very small. Thus, if the first array consists of an opaque material having apertures, the apertures need not be small and hence are not likely to be obscured by dirt or damaged by scratches. The optical elements are so arranged as to direct the light from each focal point onto the recording material. The second array of optical elements may consist of an array of lenses such as little spheres which are preferably fixed in space and with respect to the recording material so that alignment of the first array is no longer critical.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

DESCRIPTION OF THE PREFERRED EMBODIMENTS

Figure 1:
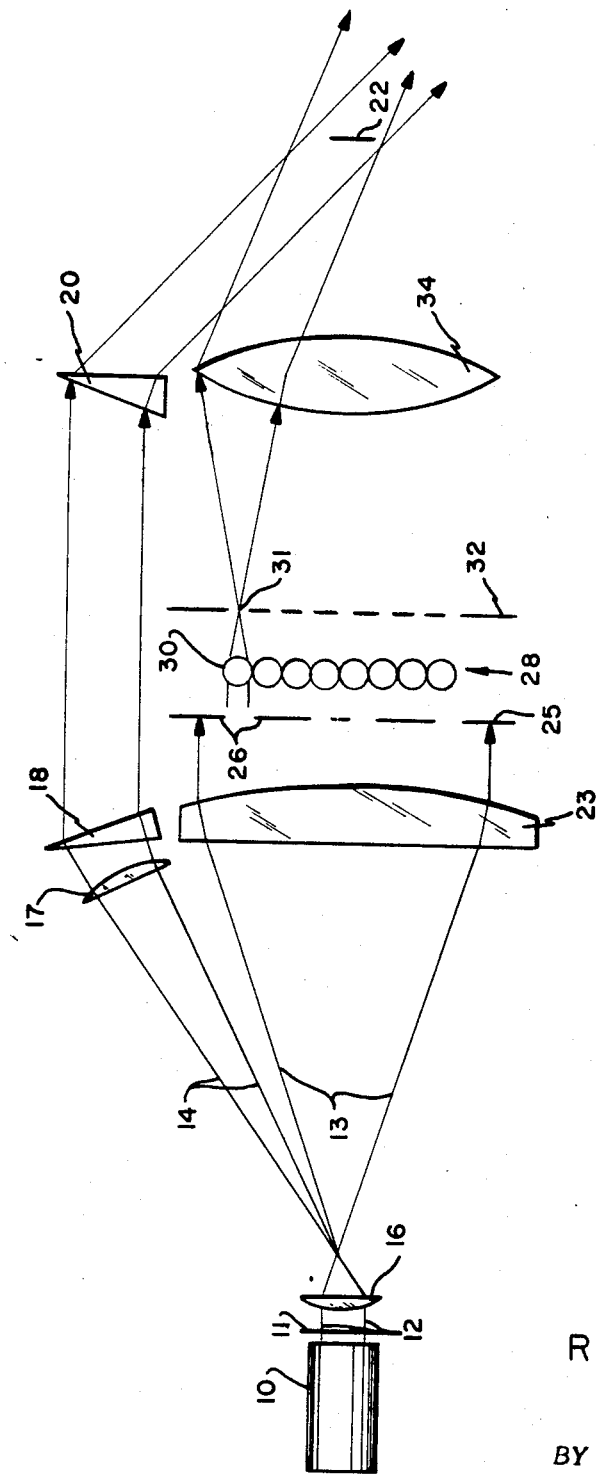
FIG. 1 is a schematic view of a holographic apparatus in accordance with the present invention for recording a hologram representative of data to be recorded.

Referring now to the drawing, wherein in like elements are designated by the same reference characters and particularly to FIG. 1, there is illustrated a holographic data recording system in accordance with the present invention. The system includes a coherent light source 10 which may be a laser as shown. The laser may be a pulsed laser or else it may be provided with a shutter 11 to permit exposure of a photosensitive recording medium for any desired length of time. The laser 10 generates an output beam 12 which may be split or divided into a subject beam 13 and a reference beam 14. Splitting of the light beam 12 into a reference and subject beam may be accomplished in any conventional manner, for example, by a beam splitter or by utilizing two separate light beams which may issue from opposite ends of the laser 10. As shown in FIG. 1, the light beam 12 may simply be split by wavefront division, that is by taking one portion of an enlarged light beam as the subject beam and the other as a reference beam.

Accordingly, the light beam 12 may be enlarged or magnified by a lens 16 which may be a positive lens as shown or else a negative lens. Alternatively, the beam may be enlarged by a suitably curved reflector. The reference beam 14 now passes through another positive lens 17 and may be deflected by a pair of prisms 18 and 20 so that the reference beam 14 is directed toward a photosensitive recording material 22. Instead of directing the reference beam by a pair of prisms it will be understood that it may also be directed by one or more reflectors.

The subject beam 13 is also enlarged and may be collimated by passing it through a lens 23 which may also be a positive lens. Again, a curved reflector may be used instead of a lens 23. The lenses 16 and 23 should be so disposed and arranged as to generate a light beam which entirely fills and covers an array 25 of light modulators representative of the data to be recorded. Such a light modulator array is also known as a page composer and serves the purpose to spatially modulate the subject beam 13 to carry the information to be recorded on the recording material 22.

The light modulator array 25 may, for example, consist of an array of light valves which may be electrically, magnetically, or mechanically switched or actuated to modulate light which passes through the valve or which is reflected by the valve. Examples of such light valves are liquid crystals, ferroelectric ceramics or crystals, Kerr cells. Pockels cells or electro-mechanical gates. These valves may be used, for example, for modulating the intensity, phase or polarization of the light beam. Preferably, however, and for simplicity there has been shown in FIG. 1 an opaque sheet 25 provided with relatively large apertures such as shown at 26. Each aperture permits the subjects beam 13 to pass while the remainder of the beam is blocked by the opaque material. This opaque material may consist of photographic film or a photographic transparency containing an array of opaque and transparent areas representative of the digital data to be recorded. Thus, any aperture 26 may represent a logical "one" in the case of digital data to be recorded.

As pointed out before, the apertures 26 in the opaque sheet 25 are of relatively large size. However, as explained before, it is necessary that these bright portions of the subject beam be as small as possible. In accordance with the present invention this is accomplished by providing a second array 28 of optical elements, that is, a focusing array. These optical elements may, for example, consist of individual lenses 30 such as spheres. Such a lens array is known as a fly's eye lens. There must be a lens 30 for each element of the light modulator array 25 such as for each possible aperture 26. Accordingly, each small beam passing one of the apertures 26 is focused substantially in a single focal point such as shown in 31. There may optionally be disposed a light filter 32 which may be a pin hole array having a pin hole for each focal point 31 generated by a particular lens 30. The lenses 30 may also be arranged ahead of the light modulator array 25.

The lens array 28 may, for example, consist of small glass spheres. Because such small glass spheres have a short focal length, it may be desirable to imbed these spheres in a medium having a slightly different index of refraction so as to reduce the focal power of the lenses. This will bring the focal point 31 further away from the lens array 28. It is also feasible to form the lenses by a bundle of optical fibers each having an index of refraction which varies radially so that each fiber has the power to focus light in a point. Such optical fibers are commercially available under the trade name "Selfoc." It will again be understood that in lieu of lenses it is feasible to use a set of reflecting surfaces such as an array of spherical mirrors.

The subject beam which has passed the lens array 28 and the optical filter 32 which is optional, may now be cast or projected on the recording material 22. To this end there may be provided an additional lens 34. The lens 34 serves the purpose to form a Fourier transform hologram or otherwise to transform the array of light modulators by the provision of the lens 34 in the path of the subject beam and between the array 28 and the recording medium 22.

In order to illuminate the recording medium 22 efficiently, the focal length of the focusing elements or lenses 30 of the array 28 should be selected so that the beams arriving at the recording medium 22 have substantially the same size as the area of the hologram. Care should be taken that substantially all of the available light of the subject beam is projected or cast on the recording medium 22. The recording medium 22 preferably is of small size, say a few millimeters in each direction.

The operation of the holographic system of FIG. 1 will now be evident. A particular array of light modulators 25 is inserted into position and the recording medium is preferably illuminated by both the spatially modulated subject beam and the reference beam. The thus recorded hologram may be developed, if necessary, and may then later be reconstructed in any conventional manner.

It will be evident that the apparatus of FIG. 1 permits the use of relatively large apertures 26 which are not subject to damage by scratching of the photographic film or by closing by dirt. Nevertheless, each of the apertures can be focused into a very small point. Furthermore, the lens array 28, due to natural manufacturing tolerances, causes variations in the size of each of the optical elements or lenses 30. This has a very desirable effect, namely the phase of the individual beamlet varies randomly from lens to lens. This, of course, will smooth out or average the large intensity peaks which would otherwise have to be recorded on the recording medium as previously discussed. It may be necessary to control the manufacture of the array 28 to insure that variations of size or of the index of refraction occur in desirable way to provide the desired degree of randomness.

It may be noted that the recording material 22 is small compared to the size of the focusing array 28.

Figure 2:
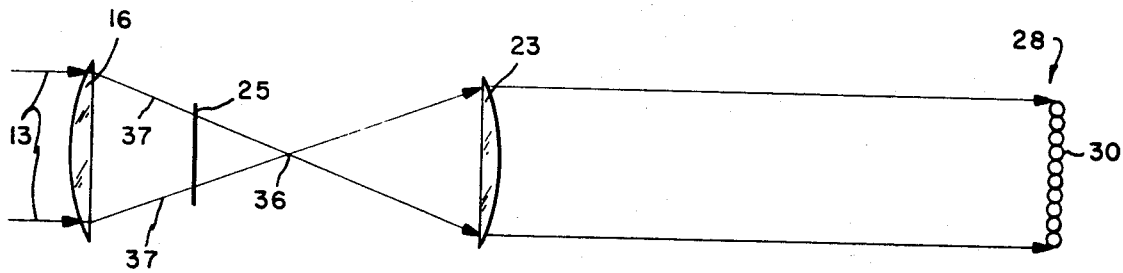
FIG. 2 is a schematic view of a portion of the recording apparatus and including an array of data to be recorded which may be smaller than the lens array and an optical system for directing substantially all of the light both into the data array and the lens array.

There may be cases where the array 25 of light modulators has a size different from that of the array 28 of optical elements. In that case, of course, the diameter of the subject beam should be reduced or enlarged so as to fill both the data array 25 and the focusing array 28 by the subject beam. Such an arrangement has been shown in FIG. 2 to which reference is now made. Here the data array 25 is smaller in size than the focusing array 28. Accordingly, the subject beam 13 may be converged by the lens 16 so that it focuses at a point 36. The data array 25 may be disposed in the converging light beam 37 so that the light will just fill the data array 25. The light beam is then collimated again by the lens 23 as previoiusly described.

Figure 3:
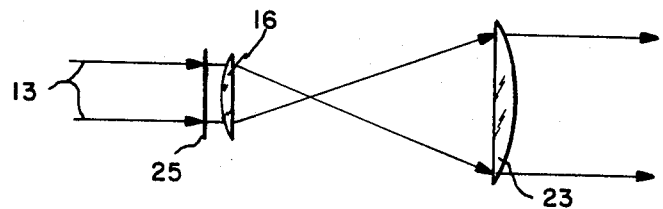
FIG. 3 is a schematic view of a different arrangement for imaging a small array of data on a relatively large lens array.

Another arrangement is shown in FIG. 3 where the data array 25 is disposed in the subject beam 13 ahead of the lens 16. In both cases the subject beam is enlarged and may be collimated as shown so as to fill the entire size of the focusing array 28. It should also be noted that one lens 23 may be placed so that the data array 25 is imaged onto the lens array to avoid spreading of the light due to diffraction.

There has thus been described a holographic apparatus for recording data and particularly digital data. The apparatus has the advantage that the data array of light modulators may be relatively large while still permitting each light modulator or light aperture to be focused in a point. The focusing array which is used for that purpose is preferably fixed with respect to the optical elements and the recording medium. Therefore, the position of each focal point representative of one digital number or the like is determined by the position of each optical element of the focusing array. Therefore, a precise alignment of the data array is no longer necessary. Variations have been described which permit the full utilization of the diameter of the light beam by recording the data on the hologram and preferably a microhologram. The redundant nature of the hologram is fully utilized. This means that the hologram may be scratched without materially impairing the quality of the reproduction.

What is claimed is:

1. Holographic apparatus for recording data comprising:
   (a) a light source for developing a coherent light beam;
   (b) means for splitting said light beam into a single reference beam and a subject beam;
   (c) a recording medium disposed in a predetermined location for recording a hologram;
   (d) means for directing said single reference beam toward said recording material;
   (e) a first array of light modulators representing the data to be recorded, said first array being disposed in the path of said subject beam;
   (f) a second array of optical elements disposed in the path of said subject beam and ahead of said recording material, each of said elements corresponding to one of said light modulators and focusing the light having passed is associated light modulator in a focal point, said second array being disposed so as to direct the light from each of said focal points onto said recording material; and
   (g) a lens disposed in the path of said subject beam and following said second array of optical elements for providing a Fourier transform of the array of light points formed by said second array of optical elements in the plane of said recording material; and wherein said second array of optical elements consists of a plurality of small lenses, said small lenses having a random variation in size such as to provide a random phase variation in the focused light, thereby to average out the peak intensities of the light recorded on said recording material.

2. A holographic apparatus as defined in claim 1 wherein said first array of light modulators consists of a sheet of opaque material having apertures therein, said apertures representing the data to be recorded, each aperture being large compared to its focal point.

3. A holographic apparatus as defined in claim 2 wherein said opaque material consists of photographic film.

4. A holographic apparatus as defined in claim 2 wherein said opaque material consists of a photographic transparency containing an array of opaque and transparent areas representative of digital data to be recorded.

5. A holographic apparatus as defined in claim 1 wherein each of said lenses is a spherical lens.

6. A holographic apparatus as defined in claim 1 wherein said second array of lenses is fixed with respect to said recording material.

7. A holographic apparatus as defined in claim 1 wherein said second array of small lenses consists of a bundle of optical fibers, each being arranged to focus the light substantially in a focal point.

8. A holographic apparatus as defined in claim 1 wherein a lens is disposed ahead of said first array of light modulators for projecting thereon a collimated beam of light.

9. A holographic apparatus as defined in claim 1 wherein an optical aperture mask is disposed between said second array of optical elements and said recording material for blocking all stray light except the focused light from each light modulator.

10. A holographic apparatus as defined in claim 1 wherein said first array of light modulators is of a size smaller than that of said second array of optical elements, and wherein optical means is provided for passing substantially all of the light of said subject beam through said first array and for subsequently expanding said subject beam to fill substantially said second array.

11. A holographic apparatus as defined in claim 1 wherein the size of said recording material and of the resulting hologram is small compared to the size of said second array of optical elements.

References Cited
UNITED STATES PATENTS

| | | | |
|---|---|---|---|
| 3,612,641 | 10/1971 | Eaglesfield | 350—3.5 |
| 3,572,881 | 3/1971 | Nishida et al. | 350—3.5 |
| 3,604,778 | 9/1971 | Burckhardt | 350—3.5 |
| 3,675,983 | 7/1972 | La Macchia | 350—3.5 |

DAVID SCHONBERG, Primary Examiner

R. J. STERN, Assistant Examiner

U.S. Cl. X.R.

360—167